United States Patent
Silverberg

[15] 3,669,435
[45] June 13, 1972

[54] ALL-CERAMIC GLASS MAKING SYSTEM

[72] Inventor: Carl G. Silverberg, Sturbridge, Mass.

[73] Assignee: American Optical Corporation, Southbridge, Mass.

[22] Filed: Feb. 26, 1970

[21] Appl. No.: 14,599

[52] U.S. Cl. ............................................. 263/40 R, 65/179
[51] Int. Cl. ........................................................ F27b 3/00
[58] Field of Search .................. 65/179, 180; 263/40 R, 48

[56] References Cited

UNITED STATES PATENTS

| | | |
|---|---|---|
| 2,641,454 | 6/1953 | Labino.................................65/179 X |
| 2,351,594 | 6/1954 | Black et al. ............................263/48 |
| 1,616,525 | 2/1927 | Booze......................................263/48 |
| 1,852,162 | 4/1932 | Harris et al. ............................263/48 |
| 3,174,729 | 3/1965 | Cala........................................65/180 |

Primary Examiner—John J. Camby
Attorney—William C. Nealon, Noble S. Williams, Robert J. Bird and Bernard L. Sweeney

[57] ABSTRACT

System for producing high quality laser glass including an all-ceramic melter with an integral orifice tube. One important embodiment of the invention includes an all-ceramic hollow bladed stirrer with means for rotating the stirrer in any desired direction and at controllable speed.

23 Claims, 8 Drawing Figures

PATENTED JUN 13 1972 3,669,435

INVENTOR
CARL G. SILVERBERG

BY *William C. Nealon*

ATTORNEYS

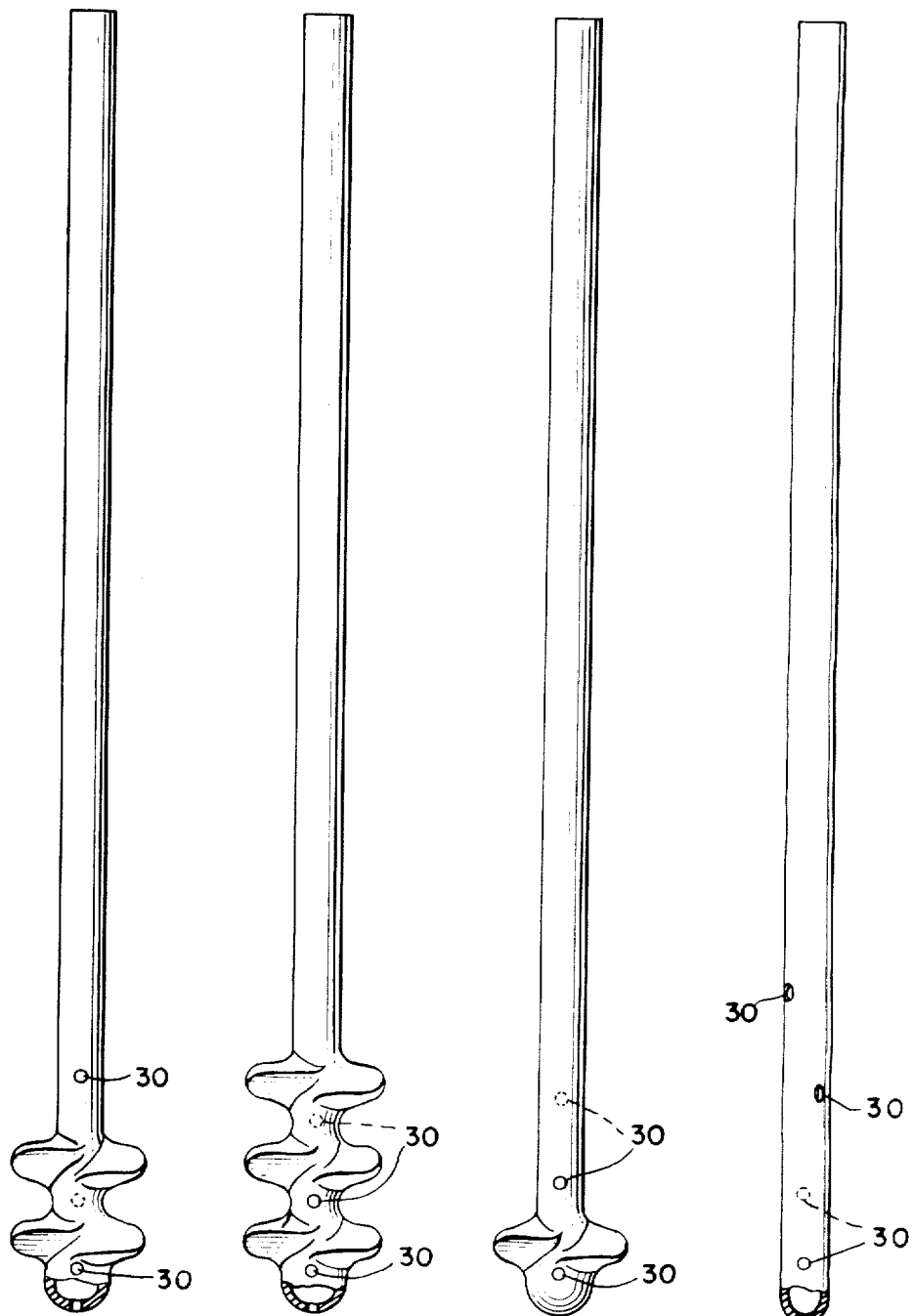

INVENTOR
CARL G. SILVERBERG
BY William C. Nealon
ATTORNEYS

3,669,435

ALL-CERAMIC GLASS MAKING SYSTEM

BACKGROUND OF THE INVENTION

The production of laser glass has presented many problems which prior to the discovery of the glass laser were not necessary to consider when making optical quality glass. For reasons more fully demonstrated below, laser glass in addition to being of the highest optical quality must also be free of platinum inclusions, materials which exhibit absorption at around 1 $\mu$m, striae, bubbles, stones and other non-metallic inclusions and must have a fluorescent lifetime of at least 500 microseconds.

Since one of the requirements for laser glass is that it be free from striae, platinum crucibles were extensively employed in the early stages of laser glass development to melt the batch materials which form the laser glass. The reason for selecting platinum as the material for the crucible is that it was known that ceramic crucibles, the only reasonable alternate possibility, contributed to the formation of striae within the finished glass.

Striae formations in glass that is formed in ceramic systems results from the ceramic refractory dissolving into the molten glass due to chemical attack by the molten glass at the surface of the refractory. A solution of refractory in molten glass overwhelmingly tends to result in an unhomogeneous final product with different indices of refraction (striae).

Although there have been some successful attempts at forming even astronomical objective quality glass in all-ceramic melting systems, the main disadvantage of such systems is the low yield of good optical quality glass. Due to the low yield obtainable from all-ceramic systems, the optical glass industry prior to the advent of laser glass changed to platinum systems for economic reasons. The choice of platinum was obvious. Platinum, a noble metal, is considered to be chemically inert in glass systems. Thus it was felt that glass formed in such platinum vessels would be free of striae. It was believed that since the platinum would be able to withstand the chemical attack of the molten glass, the possibility of the crucible itself becoming part of the final product was remote. Furthermore, it was felt that, although the initial cost of platinum is high, since platinum is a noble metal its lifetime is indefinite. In fact, as it turns out, platinum crucibles are indeed the most acceptable way of manufacturing the highest optical quality glass for use in such objects as lenses. However, glass that is melted in platinum systems contains platinum inclusions. These inclusions have been observed with particle sizes as large as 500 $\mu$m and as small as the limit of resolution of the optical microscope (about 2 $\mu$m). For optical applications the inclusion of such particles presents no problem whatsoever. However, when a glass is to be used in laser applications the inclusion of even the smallest platinum particle causes disastrous results. The high energy which is propagated throughout a laser glass causes platinum to vaporize, expand and crack the laser glass. Since it is not acceptable practice to remelt the laser glass, when this occurs the entire piece of cracked laser glass is completely worthless and must be replaced.

The occurrence of platinum inclusions in glass melted in platinum crucibles was not completely understood by those skilled in the art. Many theories were offered as to how platinum could get into the glass. Four possible mechanisms of particle formation were advanced, namely:

1. Mechanical abrasion
2. Metallurgical change in the platinum
3. Solution of the platinum by the glass
4. Oxidation of the platinum and subsequent reduction of the oxide Extensive investigation revealed the fourth named mechanism as the mechanism that significantly contributes to the formation of platinum in the glass.

Although platinum is thought of as an inert noble metal, it does oxidize at elevated temperatures forming the dioxide $PtO_2$. The oxide is metastable, decomposing to platinum metal and oxygen. These characteristics give rise to possible mechanisms for the formation of platinum inclusions in the laser glass, i.e., the platinum oxidizes, vaporizes and then is deposited on the surface of the glass either as an oxide, where it is subsequently reduced to the metal, or as the metal following reduction of the vapor at some intermediate step.

To check the foregoing hypothesis a control experiment was conducted. In this experiment a sample glass was formed in a platinum crucible in air and a corresponding sample was formed in a platinum crucible over which was maintained an inert atmosphere of nitrogen gas. The result of the experiment showed conclusively that under the test conditions when an inert atmosphere such as nitrogen was utilized in a platinum system the resulting glass contained fewer particles of platinum than glass formed in the same system in air.

While this experiment provided strong evidence for one mechanism by which platinum inclusions are found in glass, it was not a solution to the problem. Further work indicated that platinum crucibles, when subjected to neutral atmospheres at high temperatures (1475 – 1540° C.), become contaminated with small percentages of metals such as antimony and zinc which are contained in most glasses as oxides. To compound the problem, when the atmosphere is made reducing the platinum alloys with these materials to their eutectic compositions. The research in this area indicated that the use of an inert atmosphere to solve the problem of particle formation by the transfer of platinum from the crucible to the glass introduced another problem; namely, the formation of platinum particles by the alloying of platinum with some of the glass ingredients.

SUMMARY OF THE INVENTION

In accordance with the present invention the foregoing problems are significantly solved by providing an all-ceramic melting system of special design.

Although it might seem that the return to the all-ceramic type of melting would be a step backward in the optical glass technology, the results of numerous experiments have indicated that for laser glass this approach is the most acceptable.

It is accordingly an object of the present invention to provide a suitable all-ceramic system for producing high optical quality laser glass.

It is a further object of the invention to provide a method for producing a laser glass which exhibits high transmittance at the laser wavelength, high homogeneity and freedom from striae and ceramic inclusions.

BRIEF DESCRIPTION OF THE DRAWINGS

FIG. 3 is a perspective view of the stirrer of the system of FIG. 1;

FIGS. 3a – 3c are views of other stirrers which are used in the all-ceramic system of the present invention;

DESCRIPTION OF THE PREFERRED EMBODIMENTS

In accordance with the present invention, laser glass is produced in an all-ceramic system. In this regard it is to be understood that as used throughout this specification and claims the term all-ceramic system includes components which accomplish fining and homogenizing, as well as melting. In connection with the foregoing definition of all-ceramic systems, it was found that platinum particles are introduced in the glass even if the batch reaction is carried out in a ceramic unit and only the fining and homogenizing is carried out in platinum units.

As was explained above, processes of optical glass manufacture in all-ceramic systems are known. The best known of these processes is the "transfer" method. This is a pot process, using refractory ceramic crucibles which may hold up to 2 tons of molten glass. In this process, after the glass is carefully melted and stirred very thoroughly with a ceramic stirrer, it is allowed to cool slowly in the pot. During the cooling, the glass cracks in many pieces, some of which are hopefully large enough and of sufficient quality to be reheated and slumped into the shape desired. It is obvious that this process is not an efficient one.

In another known process, the molten glass is poured carefully from a pot to a large metal mold, with sufficient caution taken to avoid excessive striae formation. This casting processing has been used to produce large lens and mirror blanks for telescopes and optical windows, but usually many castings are made and rejected before one of sufficient quality is produced. The overall yield of large pieces of acceptable glass from this process, however, is superior to that resulting from the transfer method. The main disadvantage of the foregoing process for producing laser glass is that a glass blank of approximately 1 ton has to be made in order to obtain one or two 30 lb. pieces of glass usable for laser rod fabrication. Since the constituents which make up laser glass are expensive and should not be remelted, such a process is completely unsatisfactory. In addition, there are other problems in the melting of laser glasses in such systems. High purity refractories are not available in large pot sizes and it is also difficult to pour the glass from a large pot without introducing striae.

Figure 1:
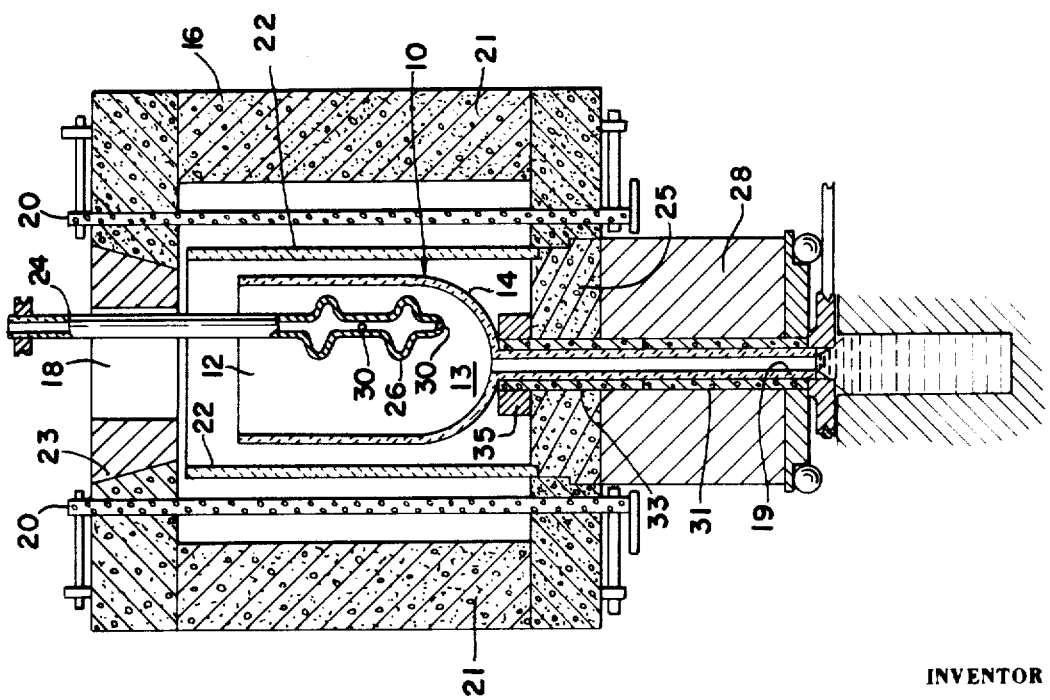
FIG. 1 is a somewhat schematic vertical cross-sectional view of the all-ceramic system of the present invention.

In contrast to the foregoing known ceramic systems, the all-ceramic system of the present invention is shown in FIG. 1. At the outset the system is described in its most general aspects.

Figure 2:
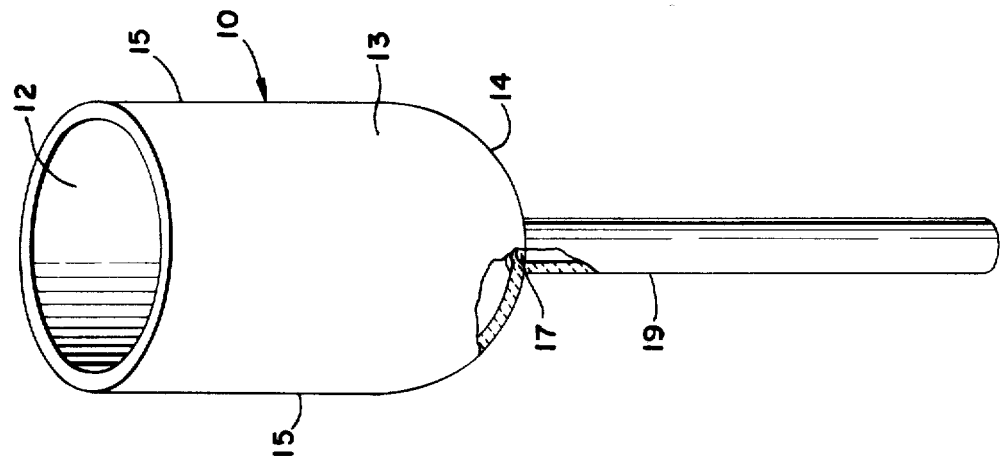
FIG. 2 is a perspective view of the crucible for melting glass in the system of FIG. 1.

The batch materials which form the laser glass are melted in a crucible 10 which is positioned within a furnace or oven 16. In accordance with the invention, crucible 10 is constructed of a material which is resistant to chemical attack by the molten glass and which has a low or negligible iron content. The selection of the crucible material is set forth in more detail below. As is shown in FIGS. 1 and 2, crucible 10 is designed with an open top 12 and a hemispherical bottom 14. Side portions 15 together with bottom 14 form the melter portion 13. At the gravitational center of bottom 14 is an orifice 17 which allows the passage of molten glass into orifice tube 19 which is formed integrally to the melter 13.

Although the construction of furnace 16 forms no part of the invention, the furnace 16 is preferably constructed of a fire-proof asbestos cement board such as Marinite with an inner lining of a high temperature aluminum glass fibrous board such as Ceraform board. Both Marinite and Ceraform are sold by Johns Manville Corporation. The foregoing combination (not shown in the drawing) forms the outer side of the furnace and the inner portions of the furnace are constructed of an insulating fire brick 21 (K-30) capable of withstanding 1650° C. The crown 23 and bottom 25 of the furnace are formed of aluminum oxide castable refractory.

The bottom of the furnace is made with a stepped bottom opening permitting crucible 10 to be raised into the furnace from the bottom.

In order to melt the glass, the system is heated by radiation from silicon carbide resistance elements 20 which are placed on four sides of the furnace. Thermocouples (not shown) are provided for controlling and recording temperatures. Separating heating elements 20 from the crucible 10 is a ceramic cylindrical muffle 22. The purpose of the muffle 22 is to homogenize or even the temperature distribution in the crucible walls and glass melt. In order to accomplish homogenization of the temperature distribution, muffle 22 is positioned between the crucible and the heating elements and extends vertically above and below the crucible. In one important embodiment of the invention the muffle is formed of silicon carbide. However, muffles formed of other materials, for example, refractory oxides, are usable in accordance with the present invention.

Homogenization of the glass (the elimination of striae) is the most critical problem in an all-ceramic melting system. The homogenization of optical glass is usually achieved by stirring. In accordance with the present invention, during the glass melting cycle the glass is stirred by the simultaneous operation of several stirring mechanisms.

An overhead stirrer 24 extends into crucible 10 through an opening 18 in the top of the furnace and is driven by a stirring head (not shown) which provides the means for rotating the ceramic stirrer at variable speeds and directions of rotation. The stirring head also permits oscillation of the stirrer horizontally as well as vertically at speeds and amplitudes independent of the rotation.

The stirring head consists of a multiblade chuck attached to a shaft with a ball bearing mounting. The shaft is driven by a timing belt and a variable speed gear first motor which can be operated at 2 to 40 rpm. The stirrer can also be oscillated at 0.1 to 1 cycle per minute by means of a second motor and a variable stroke cam (not shown). The first motor is mounted to a floor plate and the second motor assembly is connected to oscillate this floor plate so that when the plate is oscillated by the second motor the entire stirring head oscillates. The floor plate holding the stirring head is mounted on a motor driven helical screw so that the entire stirrer can be oscillated vertically and also lifted out of or lowered into the glass melt.

The foregoing stirring head and motors are not specifically shown in a figure of the drawing since the preceding description is sufficient to enable one skilled in the art to practice this feature of the invention.

The foregoing homogenization cycles are regulated by four electronic controllers with feed-back to compensate for load variations which are preferably programmed through a 7-day off-on type timer.

In the preferred embodiment of the present invention, stirrer 24 is formed with blades 26 to provide a more positive displacement of the molten glass and is shown in FIGS. 1 and 3 with two flights of blades with each flight having two blades. However, improved results are obtainable with stirrers having one flight or more than two flights of blades as is shown in FIGS. 3a and 3b.

Since contamination and striae can occur from stirrer 24 as well as crucible 10, the choice of the material for the stirrer is as important as the selection of the materials for the construction of crucible 10. In the preferred embodiment of the invention stirrer 24 is formed of the same material as crucible 10.

As is shown in FIGS. 1 and 3, stirrer 24 is hollow. By providing a hollow shaft for stirrer 24 it is possible to air cool the stirrer and thereby reducing the rate of attack by the glass on the stirrer preventing the formation of striae in the glass. In addition to the foregoing advantage, by providing the system with a hollow stirrer it is also possible to bubble gases (air) into the molten glass through apertures 30 strategically located at various points on the stirrer beneath the surface of the molten glass. Thus air or oxygen can be fed into the stirrer and bubbled into the glass which assists in stirring the glass and preventing the formation of striae.

To further facilitate stirring, the crucible is supported on a rotating pedestal hearth 28 which holds the glass melting crucible and which can be controllably rotated during the glass-making period. Hearth 28 is made of a series of refractory insulating materials and has two cylindrical heating elements 31, 33, one above the other, built concentrically into the center of the hearth and which provides the means for controlling the temperature of the orifice tube 19. Slip-rings built into the hearth provide connections for the heating elements' power and for thermocouple leads to monitor and control the temperature of each heating element.

The glass melting crucible rests on the rotating hearth 28 supported by a cast aluminum oxide tripod 35. Orifice tube 19 of crucible 10 extends into hearth 28 with its end exactly flush with the bottom of the rotating hearth. Hearth 28 is supported by ball bearings with a spherical outer race and it is driven by a variable speed motor allowing speeds from 0.1 to 1 rpm.

As pointed out above, the overhead stirring mechanism rotates the stirrer at variable speeds and directions, while oscillating the stirrer horizontally and vertically at speeds and amplitudes independent of the rotation. Since the crucible itself is supported on a rotating hearth which rotates at an independently variable speed, the combination of movements permits the stirrer to sweep out all parts of the melt with a variety of stirring patterns.

In the preferred embodiment, the stirrer is formed with blades to provide a more positive displacement of the molten glass, and the shaft of the stirrer is hollow for the purpose of air cooling to reduce the rate of attack by the glass and for bubbling gases; e.g., oxygen or air through the shaft. In the latter case, holes are provided in the blades. It is also possible to use a ceramic tube without blades but open at the lower end, as shown in FIG. 3c, if stirring is assisted by bubbling.

After the glass is thoroughly homogenized by stirring, it is cast from the bottom of the crucible. The hemispherical bottom of the crucible not only favors stirring but also facilitates emptying all the glass in the casting step. The glass is kept from running out of the chamber by a plug of glass which is cooler and more viscous than the particular melt. By heating the glass plug to its flow point, the molten laser glass passes out through tube 19 at the bottom of the system.

In one important embodiment of the invention, the all-ceramic system utilizes a thin walled mullite crucible 10 which is heated by radiation from silicon carbide resistance elements 20. Numerous tests have indicated that mullite is the preferred material for forming the ceramic crucible component of the all-ceramic system of the present invention. It is to be understood, however, that the invention is not limited to this particular material. Various factors control the selection of the material that can be effectively used to form the crucible. Since iron is known to exhibit absorption in the vicinity of 1 micron, it is imperative that the material chosen to form the crucible have a low iron content. The transmittance at 1.06 micron, the neodymium laser emission wavelength, is affected most adversely by the presence of ferrous iron in the glass (the $Fe^{2+}$ iron has an absorption that peaks around 1 um in many glasses). For many applications, an absorption at 1.06 um of $2.5 \times 10^{-3}$ $cm^{-1}$ or less is desirable. This is almost an order of magnitude better than the absorption of many optical glasses. Since there are available raw materials which permit laser glasses to be prepared that will exhibit the foregoing absorption, it is essential that the ceramic material be essentially iron-free.

Refractory oxide ceramics are the most logical group of materials for use in an all-ceramic melting system since they are compatible with the oxidizing conditions present in most laser glass melts. However, in addition to a low iron content and resistance to attack by the molten glass, the ceramics for use in forming the crucible must have good thermal shock resistance since the semi-continuous system of the present invention involves cyclic thermal variations in its operation.

Numerous tests have indicated that the micro-structure of the ceramic used should be reasonably dense and fine grained for minimum formation of stones or ceramic inclusions. The foregoing micro-structure favors good resistance to corrosion by molten glass but is not particularly favorable to withstanding thermal shock resistance. Thus, a compromise with respect to these factors has been found to be the most acceptable approach.

Of all the materials tested, mullite proved to have reasonable thermal shock and to contribute very little iron to the glass. A high purity mullite material manufactured by The McDanel Refractory Porcelain Company is considered the best material for crucibles in accordance with the requirements of the present invention. Such a material is given as Example XI of Table I below.

In addition to mullite, other refractory materials were tested as materials suitable for forming the crucible of the all-ceramic system of the present invention. These materials are shown in Table I below:

Table I — Refractory Ceramic Materials Tested

| | Constituent | % Composition by weight of major constituents with balance of composition consisting of inert impurities |
|---|---|---|
| Example I | $Al_2O_3$ | 50.7 |
| | $ZrO_2$ | 36.4 |
| | $SiO_2$ | 11.3 |
| | Modifying oxides | 1.6 |
| Example II | $Al_2O_3$ | 49.9 |
| | $ZrO_2$ | 33.2 |
| | $SiO_2$ | 15.3 |
| | Modifying oxides | 1.6 |
| Example III | $Al_2O_3$ | 94.8 |
| | $Na_2O$ | 3.6 |
| | Modifying oxides | 1.6 |
| Example IV | $Al_2O_3$ | 99.4 |
| Example V | $Al_2O_3$ | 45.0 |
| | $ZrO_2$ | 40.0 |
| | $SiO_2$ | 13.5 |
| Example VI | $Al_2O_3$ | 49.0 |
| | $ZrO_2$ | 34.0 |
| | $SiO_2$ | 15.0 |
| Example VII | $Al_2O_3$ | 68.4 |
| | $ZrO_2$ | 18.1 |
| | $SiO_2$ | 13.2 |
| Example VIII | $Al_2O_3$ | 70.0 |
| | $ZrO_2$ | 19.5 |
| | $SiO_2$ | 10.2 |
| Example IX | $Al_2O_3$ | 99.5 |
| Example X | $ZrO_2$ | 67.0 |
| | $SiO_2$ | 33.0 |
| Example XI (mullite) | $Al_2O_3$ | 63.0 |
| | $SiO_2$ | 37.0 |
| Example XII | $Al_2O_3$ | 96.0 |
| Example XIII | $Al_2O_3$ | 99.0 |
| Example XIV | $ZrO_2$ | 94.0 |
| | CaO | 5.0 |
| Example XV | $ZrO_2$ | undetermined |

The results of the various materials tested are shown in Table II below:

TABLE II.—RESULTS OF CERAMIC EVALUATION TESTS

| Example No. | Resistance to attack in static 13 mm. test | Absorption at 1 Um (percent cm.) | Fluor. lifetime (us.) | Refractive Index 589 nm. | Refractive Index 1,061 nm. |
|---|---|---|---|---|---|
| Platinum reference standard (no ceramic). | | 0.2 | 570 | 1.5194 | 1.5091 |
| IV | Good | 0.5 | 580 | 1.5205 | 1.5102 |
| VIII | do | 1.3 | 540 | 1.5200 | 1.5093 |
| II | Very good | 1.1 | 570 | 1.5208 | 1.5092 |
| XI Mullite | Good | 0.4 | 560 | 1.5188 | 1.5079 |
| XII | do | 0.4 | 560 | 1.5207 | 1.5102 |
| XV | Poor | 1.9 | 560 | 1.5208 | 1.5103 |
| I | Very good | 0.8 | 550 | 1.5223 | 1.5119 |
| III | Fair | 0.6 | 540 | 1.5223 | 1.5090 |
| IX | Good | 0.6 | 540 | 1.51967 | 1.5100 |
| XIV | Poor | 1.0 | 520 | 1.5225 | 1.5140 |
| X | Failed | Not run—ceramic dissolved in melt | | | |
| VII | Good | 1.3 | 560 | 1.5198 | 1.5096 |
| XIII | Fair | 1.0 | 560 | 1.5186 | 1.5078 |
| V | Very good | 1.3 | 530 | 1.5210 | 1.5109 |
| VI | Good | 0.4 | 510 | 1.5205 | 1.5099 |

As is explained above, when all the various factors are evaluated, particularly resistance to attack, absorption at 1 $\mu m$ and fluorescent lifetime, mullite is considered as the best material for laser glass pots or crucibles. However, from the foregoing test results, systems made of the materials of Examples I, IV, VI, IX and XII will enable the production of laser glass which is superior to laser glass made in prior art systems.

In accordance with the present invention, laser glasses were prepared in the all-ceramic system of the present invention.

The system utilized was constructed as follows:

The furnace was 125 cm square and about 100 cm high. It was heated on all four sides by silicon carbide rods, 20 units in all, each having a heating section 25 mm in diameter and 60 cm in length. Thermocouples were provided for controlling and recording the temperatures.

The furnace was constructed using a 2.54 cm thick Marinite as the outside portion, lined with 5 cm of Ceraform board and 11.43 cm of K-30 brick. The crown and bottom of the furnace were cast of Norton Company's aluminum oxide castable cement, TA 1034, which was also used for the top of the rotating hearth and the supports for the melting crucible.

The bottom of the furnace was made with a stepped bottom opening with a minimum opening diameter of 35 cm, permitting the crucible to be raised into the furnace from the bottom.

The rotating pedestal hearth was made of a series of refractory insulating materials. Two cylindrical heating elements, one above the other, were built concentrically into the center of the pedestal hearth which had a total height of 35 cm (not including crucible supports). Slip-rings built into the hearth provided connections for the heating elements' power and for thermocouple leads to monitor and control the temperature of each heating element.

The glass melting crucible rested on the rotating hearth, supported by a cast aluminum oxide tripod. The orifice tube of the crucible extended into he hearth with its end exactly flush with the bottom of the rotating hearth. The hearth is supported by ball bearings with a spherical outer race and it is driven by a variable speed motor allowing speeds from 0.1 to 1 rpm.

The crucible was a pure white mullite made by the McDanel Refractory Porcelain Company of Beaver Falls, Pennsylvania, using their ceramic composition which is 63% $Al_2O_3$ + 37% $SiO_2$ by weight. The dimensions of the crucible were 25 cm in diameter and 35 cm high with a hemispherical bottom which blended into an orifice tube 6 cm in diameter and 40 cm long. The walls of the crucible and orifice tube were 6 to 9 mm thick. The crucible was fully vitrified, translucent, with no visible grain structure and all edges were chamfered.

The stirring head was placed over the top of the furnace and held a propeller-type stirrer made of the same high purity mullite. The stirrer was 100 cm long, had a shaft 4 cm in diameter with 3 flights of 2 blades each, located on opposite sides of the shaft.

The 2.5 cm long blades were the same width as the shaft and were arranged perpendicular to the axis but sloped approximately 30° from the horizontal plane. The first pair of blades was located about 7 cm from the lower end of the shaft. The distance between adjacent blades was about 7 cm.

The stirrer projected into the furnace through a 6.5 cm wide and 15 cm long rectangular opening in the furnace top.

The stirring head consisted of a multiblade stainless steel chuck attached to a shaft with a ball bearing mounting. The shaft was driven by a timing belt and a variable speed gear motor which could be operated at 2 to 40 rpm. The stirrer could also be oscillated at 0.1 to 1 cycle per minute by means of a second motor and a variable stroke cam.

The stirring head was mounted on a helical screw so that the entire stirrer could be lifted out or lowered into the glass melt. The vertical excursion could also be programmed for limited up and down motion within a range from 0.5 to 10 cm per minute. The head was completely enclosed and cooled by means of a 2.83 m³/min. blower.

The furnace temperature was controlled by a 400 series Barber Colman proportioning controller, augmented by two 290 type Barber Colman instruments, which provide for separate control, including relays, at preset high and low limits. The temperatures were monitored on a recorder located at the lower floor level.

The input to the furnace could be varied by altering the voltage with a twelve-point tap switch provided on the transformer. The furnace transformer had 6 coarse and 6 fine settings.

The homogenization cycles were regulated by 4 Minarik electronic controllers with feed-back to compensate for load variations which were programmed through a 7-day off-on type timer.

Orifice tube temperature controllers were used to regulate the casting of the glass from the orifice tube. The input to each heater was controlled by means of a variable transformer and the temperature was indicated and controlled by 290 type Barber Colman instruments. The temperatures were fed to a recorder for monitoring and study.

Numerous laser glasses were prepared utilizing the foregoing all-ceramic system.

The preparation of a representative example is given below:

Prior to loading the batch materials, the crucible was preheated to a temperature of 1400° C, whereupon the crucible was withdrawn from the oven.

The amount of the batch was calculated to yield approximately 50 kg of finished glass and was prepared from raw materials using standard glass making weighing and mixing procedures. $SiO_2$, ZnO, $Sb_2O_3$, and $Nd_2O_3$ were introduced as such. $Li_2O$, $Na_2O$, $K_2O$, and BaO were introduced as carbonates and/or nitrates. $Al_2O_3$ was introduced as $Al(OH)_3$.

To avoid dusting and to reduce the volatilization losses of batch constituents during the reaction phase of the melt, all batches were pelletized. For that process, a rotating polyethylene disc 60 cm in diameter and 15 cm in depth was used. This disc rotated around an axis tilted at a 45° angle relative to the vertical direction. The rate of rotation was 30 rpm. Distilled water was continuously dropped onto the powder. The diameter of the pellets produced was approximately 5 mm. After pelletizing, the batch was dried at 120° C for 48 hours. During the entire batch preparation process, special care was taken to avoid introduction of organic and inorganic contaminants.

The amount of the various constituents used to prepare the glass are given in Table III below:

TABLE III

| Constituent | Amount in grams |
| --- | --- |
| $SiO_2$ | 32,889.60 |
| $Na_2CO_3$ | 6,033.60 |
| $K_2CO_3$ | 5,016.00 |
| $KNO_3$ | 4,147.20 |
| $Ba(NO_3)_2$ | 3,998.40 |
| $Sb_2O_3$ | 489.60 |
| $Al(OH)_3$ | 1,123.20 |
| ZnO | 734.40 |
| $Li_2CO_3$ | 1,209.60 |
| $Nd_2O_3$ | 1,440.00 |
| Total: | 57,081.60 |

The batch shown in Table III was added to the preheated crucible in portions of approximately 300 g.

Melting took place at the temperatures shown in curve 40 of FIG. 4 and under the melting conditions shown in Table IV below. The glass was prevented from running out of the crucible by a plug of glass having properties as set forth above.

TABLE IV.—TIME-TEMPERATURE-STIRRING RELATIONS

| Melting phase (See Fig. 4) | Duration in min. | Temperature in °C. | Hearth rotation in r.p.m. | Stirrer rotation in r.p.m.* | Stirrer oscillation in c.p.m. | |
| --- | --- | --- | --- | --- | --- | --- |
| | | | | | Horizontal | Vertical |
| 1 | 1,480 | 1,400 | | 0 | 0 | 0 |
| 2 | 120 | 1,400 | | 0 | 0 | 0 |
| 3 | 30 | 1,400 | | −8 | 0.3 | 0.25 |
| 4 | 600 | 1,340 | | 0 | 0 | 0 |
| 5 | | | 0.75 | −6 | 0.3 | 0.25 |
| 6 | 2,460 | | | −6 | 0.3 | 0.25 |
| 7 | | | | −6 | 0.3 | 0.25 |
| 8 | 30 | 1,120 | | +6 | 0.3 | 0.25 |
| 9 | 133 | 1,120 | | −6 | 0.3 | 0.25 |
| 10 | 22 | 1,120 | 0 | −0.3 | 0 | 0 |

*Direction of Rotation: Clockwise (+), Counterclockwise (−).

After completion of the homogenization phase, the orifice was heated to approximately 1000° C and the viscous glass was extruded from the orifice of the melter portion of the crucible at the rate of 1.5 cm/sec. through a graphite sleeve of 7.5 cm inside diameter. The outside dimensions of the sleeve were 35.5 cm in height and 25.5 cm square.

Figure 5:
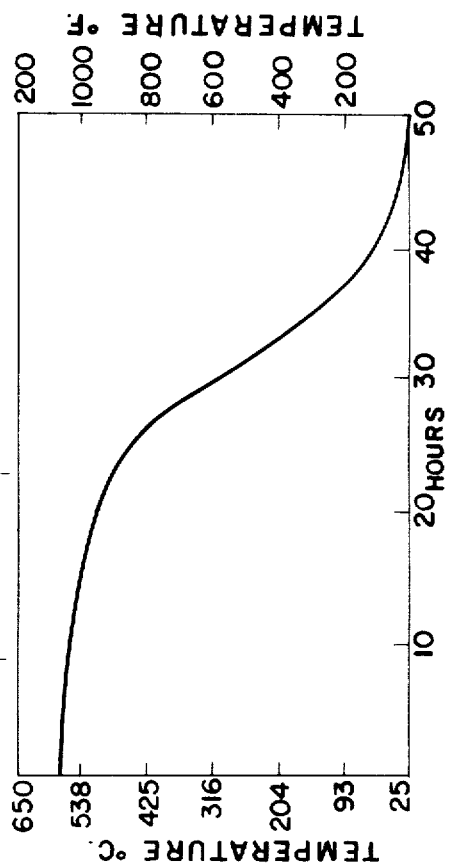
FIG. 5 is an annealing curve for a laser glass prepared in the all-ceramic system of the present invention.

During this casting operation, the stirrer rotated slowly and was placed close to the wall of the crucible in order to move striae located between the paddles of the stirrer towards the edge of the finished billet. The portion of the glass billet leaving the sleeve was covered immediately with thermally insulating material. The casting of the glass was made into a vertical molding machine to produce a billet 8 cm in diameter and approximately 110 cm long. After completion of the casting operation, the covered billet was moved to the annealing furnace and annealed according to the time-temperature relation given in FIG. 5. That type of anneal resulted in birefringence of less than 10 μm/cm. A billet of this glass was then drawn into a laser rod which had a finished dimension of 5 cm in diameter and 200 cm in length. The composition of the finished glass was:

| Composition | % by Weight |
| --- | --- |
| $SiO_2$ | 68.52 |
| $Li_2O$ | 1.02 |
| $Na_2O$ | 7.35 |
| $K_2O$ | 11.13 |
| ZnO | 1.53 |
| BaO | 4.90 |
| $Al_2O_3$ | 1.53 |
| $Sb_2O_3$ | 1.02 |
| $Nd_2O_3$ | 3.00 |

The refractive index of the rod was constant over the length and the diameter $\pm 1 \times 10^{-5}$. When the rod was properly aligned in a laser cavity no damage occurred with energy densities as high as 15J/cm² even after numerous shots.

In addition to the foregoing example, in several melts for the same composition the time-temperature relation during the homogenization phase was changed. Two of the temperature curves are indicated by dotted lines 42, 44 in FIG. 4.

Figure 4:
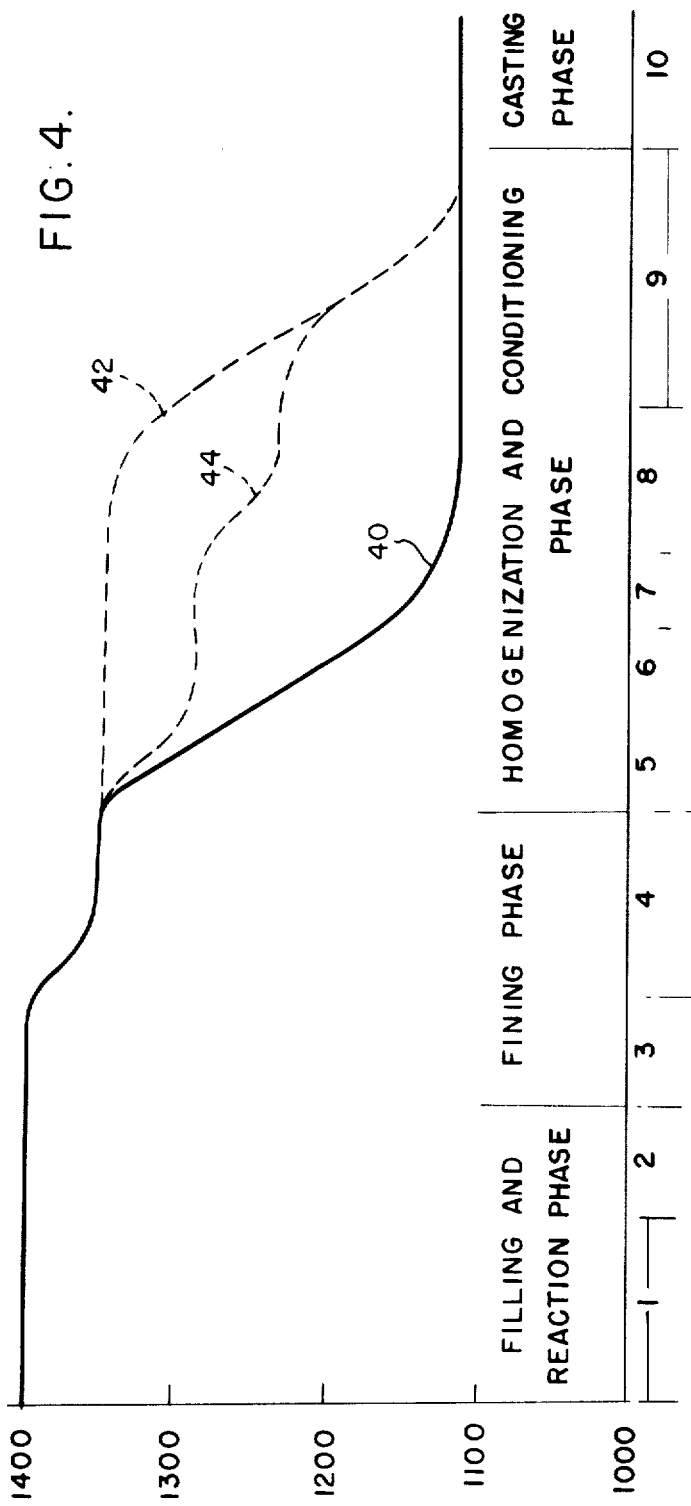
FIG. 4 is a graph showing some melting curves for melting glass in the all-ceramic melter of the present invention.

Although the time-temperature relation shown by the solid curve 40 yielded best results, good optical quality glass was obtained between all the melting conditions shown in FIG. 4.

In connection with the foregoing examples, it is to be understood that the parameters disclosed form no part of the invention. Such details are disclosed to illustrate the operation of the all-ceramic system. In this regard the parameters vary depending on the particular glass being made.

The invention is an all-ceramic system which does not contribute to absorption at 1 micron and which includes a furnace capable of operating at temperatures up to 1500° C, a crucible to hold the glass, means for stirring which homogenizes the glass and a means for casting the glass into billets. In connection with this invention the dimensions of the system as disclosed in the examples is not intended to be controlling.

In connection with the improved results which are obtained from the all-ceramic system, over a period of ten months, 75 melts were made in such a system.

The 75 melts resulted in a total of 868.3 kg of different types of laser glass. In total, 11 different glass types were prepared. Eight of these glasses were new, experimental glasses. The other three glasses were MG1838, MG1916 and MG1020 of Table V below. 35 melts of the latter glass were made. The composition and information on usable amount of glass is given in Table V. As determined on 18 melts of MG1838, the reproducibility of the refractive index from melt to melt measured at the D line is 1.5132 ± 0.0005. The homogeneity of the refractive index over one full billet was better than one unit in the fifth place as determined on one experimental glass melt. This excludes the effect of visible striae on the refractive index. The absorption coefficient at 1.00 μm of 18 melts of MG1838 glass was $(2.5 \pm 0.3) 10^{-3} cm^{-1}$.

Table V — Composition in weight % and usable amount of three glasses made in the all-ceramic melter

| Glass Components | MG1838 | MG1020 | MG1916 |
| --- | --- | --- | --- |
| $SiO_2$ | 69.22 | 68.52 | 67.80 |
| $Li_2O$ | 1.03 | 1.02 | 1.01 |
| $Na_2O$ | 7.43 | 7.35 | 7.28 |
| $K_2O$ | 11.24 | 11.13 | 11.01 |
| ZnO | 1.55 | 1.53 | 1.52 |
| BaO | 4.95 | 4.90 | 4.85 |
| $Al_2O_3$ | 1.55 | 1.53 | 1.52 |
| $Sb_2O_3$ | 1.03 | 1.02 | 1.01 |
| $Nd_2O_3$ | 2.00 | 3.00 | 4.00 |
| Number of melts made | 18 | 13 | 4 |
| Total amount of glass in kg | 226.8 | 149.2 | 51.0 |
| Usable amount of glass in kg | 39.7 | 35.4 | 13.4 |
| Yield in % | 17.5 | 23.7 | 26.3 |

Accordingly, by providing an all-ceramic system in accordance with the invention a striae free glass results without metallic inclusion such as platinum.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes that come within the meaning and range of equivalency of the claims are therefore intended to be embraced therein.

I claim:

1. In a system for making glass including a melter positioned within a furnace and heating elements for heating said melter, the improvement comprising a muffle interposed between said melter and said heating elements, said muffle surrounding and extending axially above and below said melter so that homogenization of the temperature distribution in said melter is accomplished, and said muffle being spaced from said melter so that said melter may be separately inserted and withdrawn from said furnace.

2. The system as set forth in claim 1 wherein said muffle has a cylindrical shape.

3. A stirrer for homogenizing a glass melt comprising a hollow cylindrical shaft having at least one blade formed thereon, said hollow cylindrical shaft having at least one aperture through a sidewall thereof, said at least one aperture being positioned so as to be located beneath the surface of the glass melt when said stirrer is utilized in a melter, and means for introducing a flow of gas into said hollow cylindrical shaft whereby said at least one blade and gas escaping from said hollow cylindrical shaft through said at least one aperture cooperate in homogenizing the glass melt.

4. The stirrer as set forth in claim 3 wherein said stirrer is formed of an all-ceramic material.

5. The stirrer as set forth in claim 4 wherein said all-ceramic material is mullite.

6. The stirrer as set forth in claim 5 wherein said mullite has the following composition in percent by weight:

| | |
| --- | --- |
| $Al_2O_3$ | 63.0 |
| $SiO_2$ | 37.0 |

7. The stirrer as set forth in claim 4 wherein said all-ceramic material consists essentially of $Al_2O_3$ of a purity of at least 96 percent by weight with the balance of the composition being inert impurities.

8. The stirrer as set forth in claim 5 wherein said all-ceramic material consists essentially of the following ranges of composition in percent by weight:

| | |
| --- | --- |
| $Al_2O_3$ | 49–51 |
| $ZrO_2$ | 34–37 |
| $SiO_2$ | 11–15 | with the balance of the composition being modifying oxides.

9. In a system for making glass including a furnace and a melter wherein the improvement comprises a stirrer for homogenizing glass melts, said stirrer comprising a hollow cylindrical shaft having at least one blade formed thereon, said hollow cylindrical shaft having at least one aperture through a sidewall thereof, said at least one aperture being positioned so as to be located beneath the surface of the glass melt when said stirrer is utilized in said melter, and means for introducing a flow of gas into said hollow cylindrical shaft whereby said at least one blade and gas escaping from said hollow cylindrical shaft through said at least one aperture cooperate in homogenizing the glass melt.

10. In a system for making glass including a furnace and a melter wherein the improvement comprises a stirrer for homogenizing glass melts, said stirrer comprising a hollow cylindrical shaft having a blade formed thereon and means for introducing a flow of gas into said shaft, wherein said stirrer has at least one aperture positioned to be located beneath the surface of molten glass when the stirrer is utilized in a melter, wherein said stirrer is formed of an all-ceramic material.

11. The stirrer as set forth in claim 10 wherein said all-ceramic material is mullite.

12. In a system for making glass including a furnace and a melter wherein the improvement comprises a stirrer for homogenizing glass melts, said stirrer comprising a hollow cylindrical shaft having a blade formed thereon and means for introducing a flow of gas into said shaft, including means for rotating said stirrer clockwise and counter-clockwise.

13. The system as set forth in claim 12 including means for oscillating said stirrer vertically.

14. The system as set forth in claim 13 including means for oscillating said stirrer horizontally.

15. The system as set forth in claim 14 including a cylindrical muffle surrounding said melter.

16. The system as set forth in claim 14 wherein said melter has a hemispherical bottom having an orifice positioned on the gravitational center of said bottom and an orifice tube integrally formed on said melter and surrounding said orifice tube.

17. The system as set forth in claim 16 wherein said hemispherical bottom is supported on a rotatable hearth.

18. The system as set forth in claim 17 including means for rotating said hearth.

19. The system as set forth in claim 18 wherein said rotatable hearth is stepped to form a stepped bottom on said furnace.

20. The system as set forth in claim 17 wherein said orifice tube extends into said hearth, said hearth having at least one heating element positioned therein for heating said orifice tube.

21. The system as set forth in claim 20 wherein said melter, said stirrer and said orifice tube are formed of an all-ceramic material.

22. The system as set forth in claim 21 wherein said all-ceramic material is mullite.

23. In a system for making glass including a furnace, a melter, a stirrer associated with the melter, and a muffle surrounding the melter, wherein the improvement comprises said melter, stirrer, and muffle being formed essentially completely from an all-ceramic material, said all-ceramic material being selected from the group consisting of mullite, alumina of a purity of at least 96 percent by weight, and a material which consists essentially of the following ranges of composition in percent by weight:

| | |
|---|---|
| $Al_2O_3$ | 49–51 |
| $ZrO_2$ | 34–37 |
| $SiO_2$ | 11–15. |

* * * * *